Nov. 23, 1954 C. ROEHRI 2,694,935
RECIPROCATING AND LOCKING APPARATUS
Filed April 28, 1952 3 Sheets-Sheet 1

Inventor:
Carl Roehri.
By Zabel, Baker, York, Jones & Dithmar
Attorneys.

Nov. 23, 1954 C. ROEHRI 2,694,935
RECIPROCATING AND LOCKING APPARATUS
Filed April 28, 1952 3 Sheets-Sheet 2

Inventor,
Carl Roehri.
By Zabel, Baker, York, Jones & Dithmar
Attorneys.

Nov. 23, 1954 C. ROEHRI 2,694,935
RECIPROCATING AND LOCKING APPARATUS
Filed April 28, 1952 3 Sheets-Sheet 3
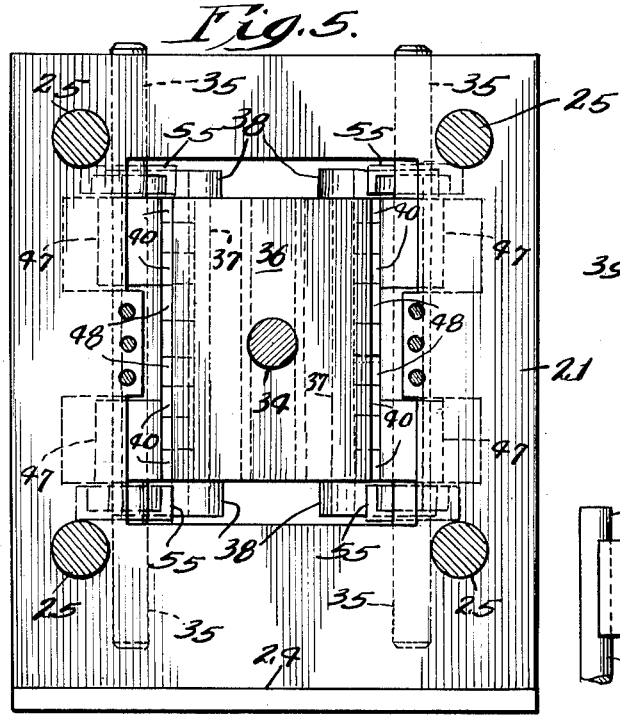
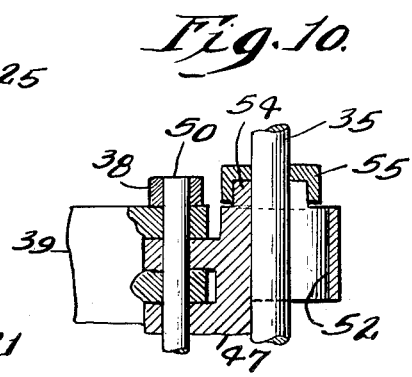
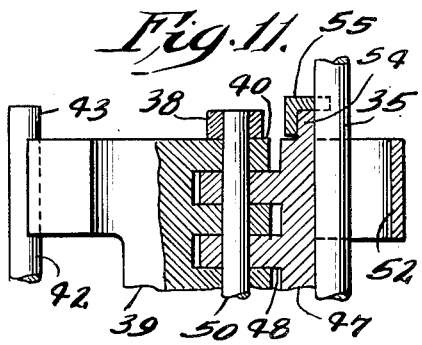
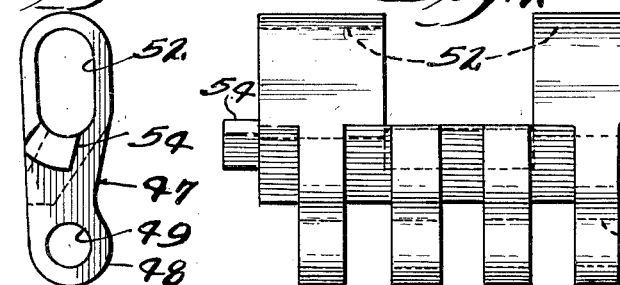
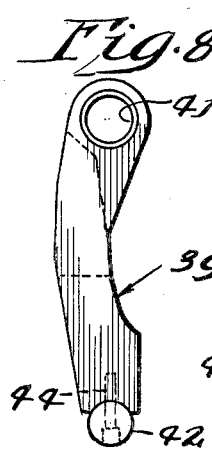
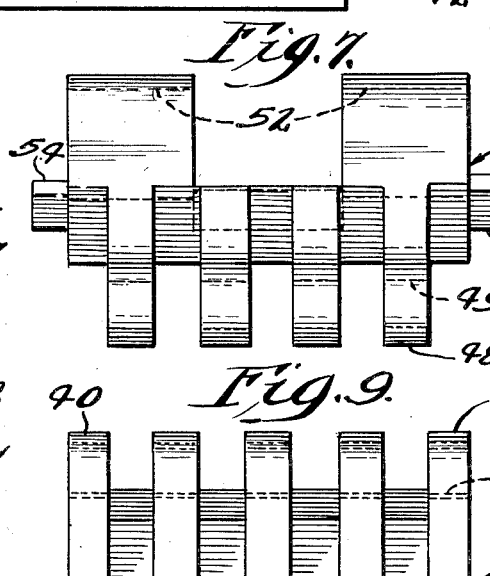
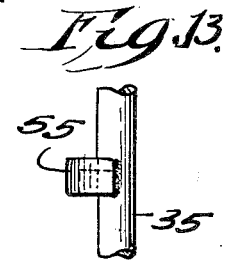
Inventor
Carl Roehri,
Zabel, Baker, York
By Jones & Lithmar
Attorneys United States Patent Office 2,694,935
Patented Nov. 23, 1954

2,694,935

RECIPROCATING AND LOCKING APPARATUS

Carl Roehri, Chicago, Ill.

Application April 28, 1952, Serial No. 284,675

5 Claims. (Cl. 74—110)

My invention relates to reciprocating and locking apparatus for die machines or the like in which a reciprocating member moves a die or similar member into and out of locked, pressure relationship with another die or similar member. This invention is an improvement on the invention described and claimed in my prior U. S. Patent No. 2,460,658, dated February 1, 1949.

One object of my present invention is to provide improved apparatus for locking a reciprocating member in position at one end of its stroke with the member in predetermined, pressure engagement with another member.

Another object of my invention is to provide apparatus for moving and locking a reciprocating member in the above referred to manner comprising a frame, reciprocating drive means, first link means pivotally connected with said reciprocating drive means, second link means pivotally connected between said member and said first link means, bearing shafts fixed on said frame, guide means adjacent said shafts, third link means having lost motion apertures for slidingly and rotatably engaging said shafts, said third link means also being pivotally connected at or near the junction of said first and second link means, guidable means on said third link means adjacent the periphery of said lost motion aperture and adapted to coact with said guide means to rotate said third link means about said shafts in predetermined relation therewith when the reciprocating member travels into and out of locked position.

It is a further object of my invention to provide moving and locking apparatus for a reciprocating member as above referred to which will greatly reduce the noise accompanying the operation of such apparatus when the member travels into and out of locked position. In order to accomplish this object, the third link means is provided with lost motion apertures for slidingly and rotatably engaging the bearing shafts so that the third link means, in response to cooperation between guide and guidable means, moves smoothly and quietly with respect to the bearing shafts when said member travels into and out of locked position, thus radically reducing the noise usually involved in the operation of apparatus of this type.

Another important object of my invention is to provide apparatus of the above description in which a minimum of impact occurs between the various link means and the shafts when the reciprocating member is moved into locked, pressure position, thus reducing the shearing stresses on the various links and shafts.

A further object of my invention is to provide apparatus of the above mentioned character which has a guide means cooperating with a guidable means on or adjacent the bearing shafts for rotating the third link means about the shafts in predetermined relation therewith when the reciprocating member travels into and out of locked position.

Still another object of my invention is to provide linkage means cooperating with shafts whereby the reciprocating member is held in locked, pressure relation with another member when the reciprocating member occupies its extreme position in one direction and which limits the movement of said member when it travels in the opposite direction.

Other objects and advantages of this invention will further appear during the course of the following description taken in conjunction with the accompanying drawings.

In the drawings:

Fig. 5 is an end elevational view, partly in section, of my apparatus;

Fig. 6 is a side elevational view of the third link means of my apparatus;

Fig. 7 is a front view of the third link means shown in Fig. 6;

Fig. 8 is a side elevational view of the second link means of my apparatus;

Fig. 9 is a front view of the second link means shown in Fig. 8;

Fig. 10 is a sectional view on line 10—10 of Fig. 4;

Fig. 11 is a sectional view on line 11—11 of Fig. 2;

Fig. 12 is a front view of one guide means and associated bearing shaft of my mechanism; and Fig. 13 is a side view of the guide means and shaft shown in Fig. 12.

Figure 1:
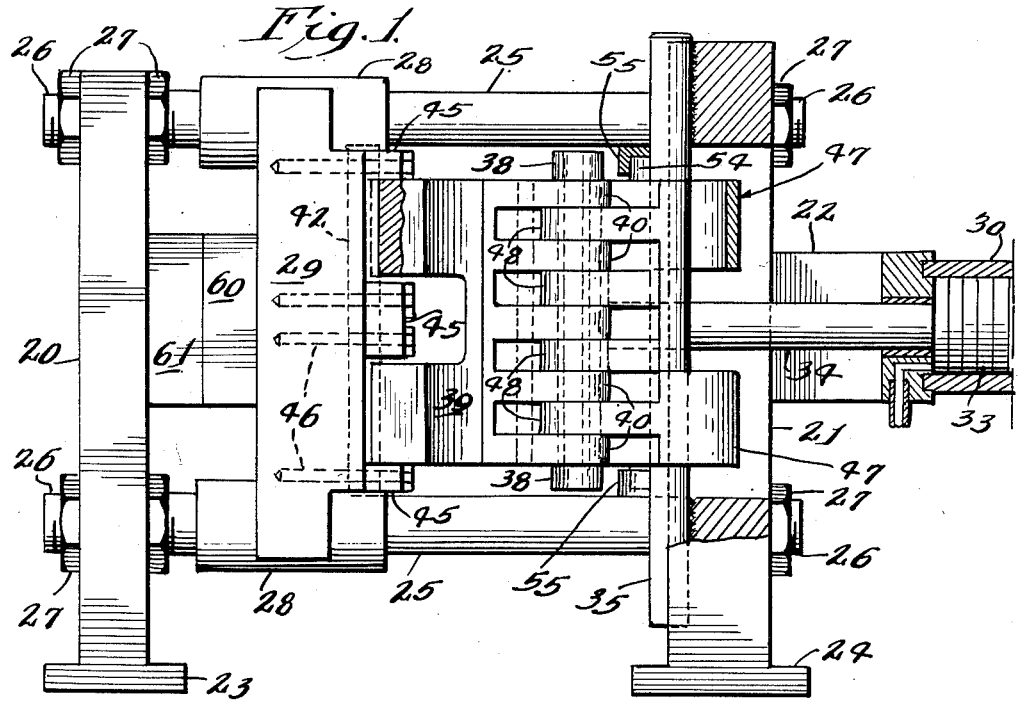
Fig. 1 is a side elevational view, partly in section, of apparatus embodying my invention.

Referring to Fig. 1 of the drawings, my improved apparatus for moving and locking a reciprocating member in pressure relation with another member includes a frame (such as shown in my said prior Patent No. 2,460,658) having an end plate 20, an opposite, apertured end plate 21, a yoke member 22, feet 23 and 24, bars 25 with threaded end portions 26, retaining nuts 27, bar engaging sleeves 28, reciprocating member 29, cylinder 30, piston 33, connecting rod 34 and a pair of vertically disposed bearing shafts 35. The bearing shafts 35 are integral with or mounted on end plate 21 along the vertical sides of the central aperture therein.

My apparatus further includes a reciprocating drive member 36 (Fig. 2) which is secured to connecting rod 34. Drive member 36 has spaced apertures for receiving pivot pins 37 to which are connected a next described first link means 38. Also, member 36 has a forwardly extending protuberance 36a which functions as a guide element.

As seen in Figs. 2–5, the following described system of links, shafts and pivotal connections comprises a symmetrical arrangement in my apparatus. Therefore, the elements lying on only one side of the vertical plane passing through the longitudinal center of the apparatus will be described in detail.

First link means 38 comprises upper and lower (Figs. 1 and 5) link elements which are mounted at one end on pin 37 of drive member 36. Thus first link means 38 is pivotally connected to the reciprocating drive member 36.

The other end of a first link means 38 is pivotally connected to one end of a second link means 39. Structural details of one form of second link means 39 are shown in Figs. 8 and 9. The said end of second link means 39 comprises a plurality of spaced fingers 40 having aligned apertures 41 extending therethrough. The opposite end of means 39 is provided with a transverse member 42 which extends somewhat beyond the sides of means 39 as shown at 43 (Fig. 9). Member 42 may be integral with means 39 or it may be separate, as shown, in which case it is attached to means 39 in any suitable manner as by bolts 44.

Second link means 39 is pivotally connected to reciprocating member 29 as by clamps 45 which overlie member 42 and are secured by bolts 46 or the like to member 29. It will be noted that member 29 has a transverse groove in which member 42 is seated for pivotal action and maximum bearing surface. This type of connection between second link means 39 and member 29 eliminates shearing stresses at the connection since compressive stress is transferred directly from second link means 39 to member 29 through the transverse member 42.

The fingered end of a second link means 39 is pivotally connected to one end of a third link means 47, a form of which is best shown in Figs. 6 and 7. Means 47 has spaced fingers 48 with aligned apertures 49 therein. Fingers 48 interfit with fingers 40 of second link means 39, and a pin 50 passes through the respective apertures 41 and 49 to connect the two means 39 and 47 in a pivotal manner.

Also pivoted to pin 50 at its ends are the upper and lower link elements of the previously described first link means 38 (Figs. 2-4, 10 and 11).

Third link means 47 is provided at its other end with an elongated lost motion aperture 52 for slidingly and rotatably engaging bearing shaft 35. A boss, here called guidable means 54, is provided on each side of third link means 47 adjacent the inner end of aperture 52 (Figs. 6 and 7). The function of guidable means 54 will be described presently.

Figure 2:
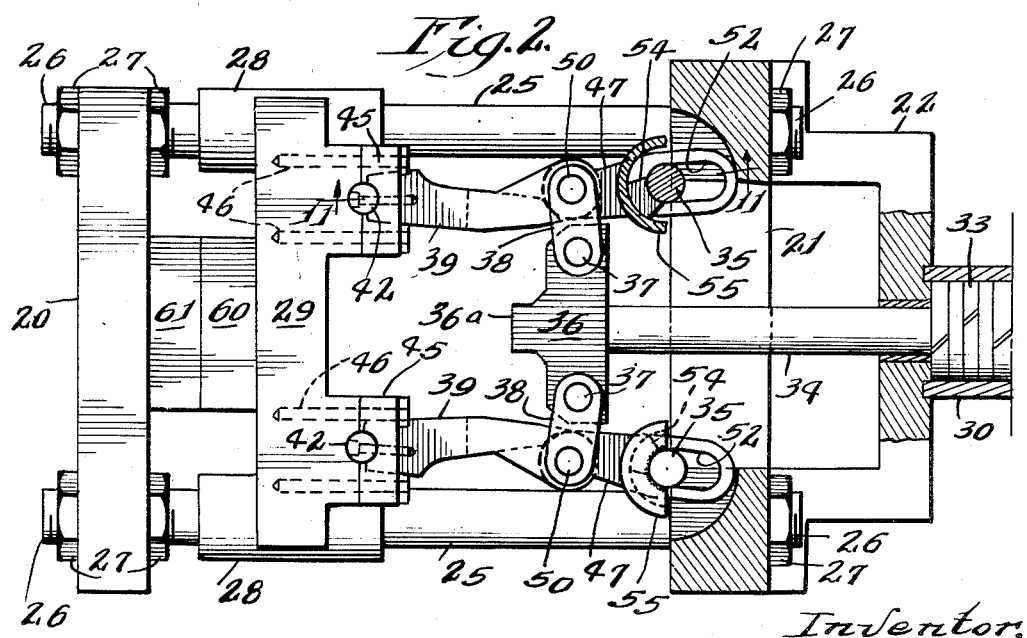
Fig. 2 is a top view, partly in section, of the apparatus shown in Fig. 1, and illustrating the reciprocating member in its locked position at one end of the stroke.

A guide means 55 is mounted in effective relation with shaft 35, there being an individual guide means element at each end of the shaft. In the form of my invention here shown, guide means 55 is mounted directly on the shaft. It is generally semi-circular in shape (Figs. 2, 4 and 12), and it is L-shaped in cross section (Figs. 1, 11 and 13). Guide means 55, therefore, provides an arcuate guide channel when mounted on shaft 35, the channel being concentric with the shaft. Guide means 55 is oriented on shaft 35 as generally shown in Fig. 2. At the proper point in the operation of my apparatus, guidable means 54 on third link means 47 enters the arcuate channel and the cooperation between guidable means 54 and guide means 55 causese third link means 47 to rotate about shaft 35 in proper, predetermined relation therewith.

Completing the description of the machine embodying my invention, reciprocating member 29 carries a centrally disposed die member 60. Cooperating with die member 60 is another die member 61, which in the illustrated machine is a fixed member.

Figure 3:
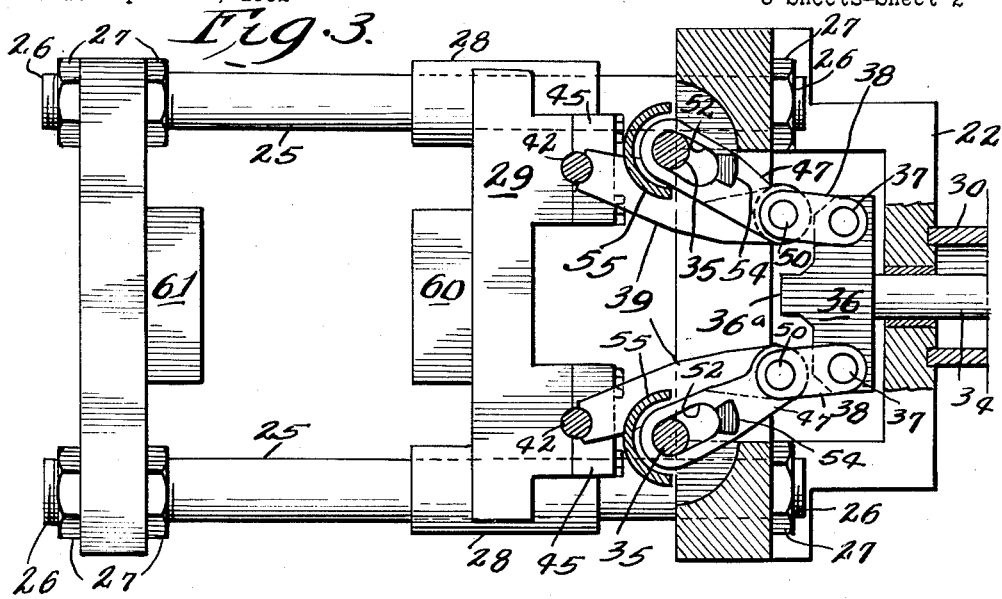
Fig. 3 is the same as Fig. 2 except that the reciprocating member is in its extreme right hand position.

The operation of my invention may be described as follows:

Fig. 3 illustrates my apparatus when the elements are in the fully open stroke position. The distance between die members 60 and 61 is a maximum, and, it will be noted, this distance is desirably substantial, relatively speaking. The reciprocating drive member 36 occupies an extreme right hand position in Fig. 3, and the first, second and third link means are shown in their corresponding positions. It will be noted that the outer end of elongated lost motion aperture 52 of link 47 is in engagement with bearing shaft 35.

Figure 4:
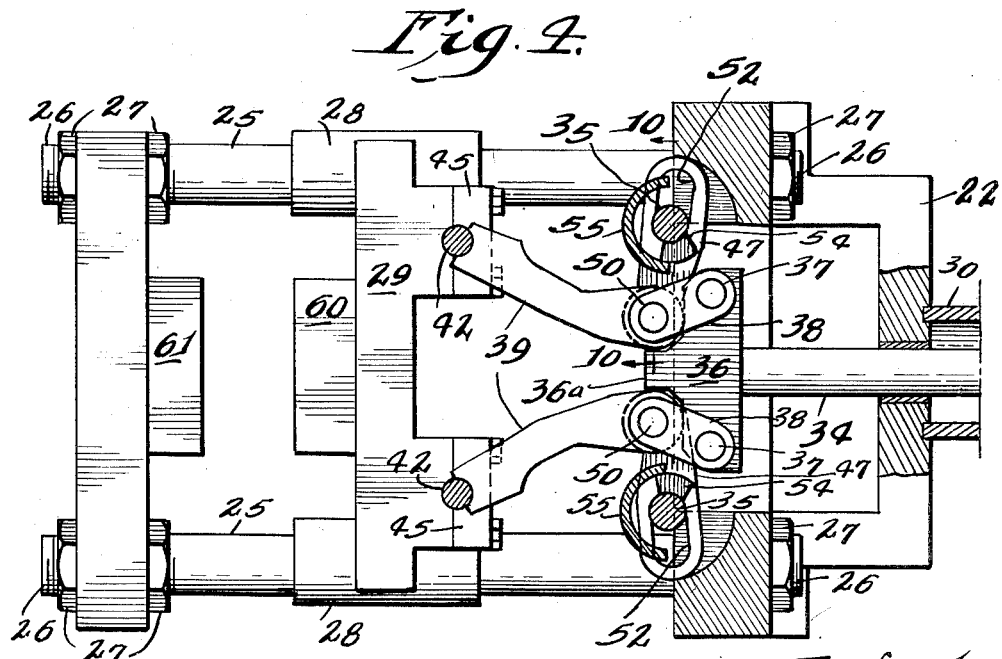
Fig. 4 is the same as Fig. 2 except that the reciprocating member is shown in a position intermediate the positions shown in Figs. 2 and 3.

In Fig. 4 the parts of my apparatus are shown in the positions they occupy at an intermediate point in the stroke when reciprocating drive member 36 and reciprocating member 29 are moved part way to the left toward closed stroke position. It will be noted that third link means 47 has been rotated partially about bearing shaft 35, and that a sliding action has occurred between the two elements so that the inner end of elongated lost motion aperture 52 now engages the surface of shaft 35. The desired sliding action has been insured by engagement of protuberance 36a of drive member 36 with the fingers 40 and 48 of the second and third link means 39 and 47. The angular position of third link means 47 relative to shaft 35 is such that guidable means 54 has just started to enter the channel of guide means 55. Also, the pivotal connection of the first, second and third link means at pin 50 occupies a position relatively close to the center line of the apparatus. Die member 60, of course, occupies a middle stroke position with respect to the other die member 61.

As reciprocating drive member 36 moves farther to the left toward the closed end of the stroke, third link means 47 continues to rotate around shaft 35, and guidable means 54 continues to engage guide means 55, thereby insuring that the rotation occurs in the desired, predetermined manner. When the reciprocating members 29 and 36 nearly reach the closed end of the stroke, second link means 39 and third link means 47 are substantially co-linear, as generally shown in Fig. 2. As reciprocating drive member 36 reaches its closed stroke limit of movement, first link means 38 is effective to move pin 50 and the associated ends of the first, second and third link means to a maximum position away from the center line of the apparatus. The length of first link means 38 is such that this final position of pin 50 represents an over center position of the generally aligned second and third link means 39 and 47, respectively. Thus, the second and third link means may be regarded as a toggle arrangement in which the junction of the two means is moved to an over center, locked position by first link means 38. Die members 60 and 61, of course, are positioned so as to be froced tightly together when the toggle arrangement is in the over center position shown in Fig. 2.

The high amount of pressure between die members 60 and 61 is generated for the most part by moving the junction pin 50 of the second and third link means to its over center position, rather than directly by the force of the piston alone. When in over center position, the second and third link means 39 and 47, respectively, are locked in pressure applied condition, and no further pressure need be supplied by piston 33 to maintain die members 60 and 61 in pressure relation. When the link means are locked as aforesaid, it will be noted that the axes of bearing shaft 35, pin 50 and transverse member 42 of reciprocating member 25 lie generally in a common plane. Thus, pressure stresses are transmitted along a generally straight line between bearing shaft 35 and transverse member 42. The machine may be left in this closed, pressure condition for any desired length of time without supplying any holding force.

When the machine operation has been completed to the point that no further pressure is required, piston 33 is reversed to move toward the open end of the stroke. Reciprocating drive member 36 travels to the right, looking at Figs. 2-4, and the various link means move through the above described course but in reverse direction. As the opening stroke continues, guidable means 54 emerges from guide means 55, and third link means 47 slides as well as rotates with respect to shaft 35. The opening stroke is ended when the elements reach the positions shown in Fig. 3, after which the next stroke occurs in the closed direction.

The Fig. 3 limit position of the elements is established when the second and third link means 39 and 47 have jack-knifed to the point where the bases of the fingers 40 and 48 come into engagement.

It should be mentioned that the above described action of the various link means is dependent on the provision of protuberance 36a, guidable means 54 and guide means 55. Without these elements, the desired, predetermined relation between third link means 47 and shaft 35 is not with certainty established or maintained during the stroke of the apparatus.

From the above description it is thought that the construction and advantages of my invention will be readily apparent to those skilled in the art. Various changes and modifications may be made without departing from the spirit or losing the advantages of the invention.

Having thus described my invention, what I claim as new and desire to secure by Letters Patent is:

1. Apparatus for moving a reciprocating member and locking same in pressure applying position at one end of its stroke, comprising a frame on which the member is slidingly mounted, bearing shafts on said frame, a drive member, a guide protuberance on said drive member, first link means pivotally connected with said drive member, second link means pivotally connected with the reciprocating member, third link means having elongated lost motion apertures which slidingly and rotatably engage said bearing shafts, said third link means being pivotally connected with said second link means and comprising therewith a toggle arrangement, said toggle arrangement being engageable by said guide protuberance during a portion of the stroke, said first link means also being pivotally connected to said toggle arrangement, guide means disposed in effective relation with said bearing shafts, guidable means on said third link means for cooperation with said guide means to insure rotation of said third link means in predetermined relation with said bearing shafts during a portion but not all of the stroke, said first link means being effective to move the toggle arrangement to over center position at one end of the stroke to thereby lock the reciprocating member in pressure applying position.

2. The combination of claim 1 wherein said first link means is pivotally connected with said second and third link means at the junction thereof.

3. The combination of claim 1 wherein said guide means comprises members mounted on said bearing shafts, each member having an arcuate guide channel concentric with the associated shaft, and wherein said guidable means is positioned on said third link means to insure rotation of said third link means in predetermined relation with said bearing shafts during a portion of the stroke.

4. A toggle arrangement for moving and locking a reciprocating member in pressure applying position at one end of its stroke, said arrangement including a fixed bearing shaft, a reciprocating drive member, a guide protuberance on said drive member, a first link means pivotally connected with said drive member, a second link means pivotally connected with said reciprocating member, a third link means having an elongated lost motion aperture which slidingly and rotatably engages said bearing shaft, said third link means being pivotally connected with said second link means to form a toggle, said toggle being engageable by said guide protuberance during a portion of the stroke, said first link means being connected to actuate the toggle upon reciprocation of said drive member, and means to insure rotation of said third link means in predetermined relation with said bearing shaft during a portion but not all of the stroke, said first link means being effective to move the toggle to over center position at one end of the stroke to thereby lock the reciprocating member in pressure applying position.

5. The combination of claim 4 wherein said first link means is pivotally connected with said second and third link means at the junction thereof.

References Cited in the file of this patent

UNITED STATES PATENTS

| Number | Name | Date |
|---|---|---|
| 1,899,295 | Schulze | Feb. 28, 1933 |
| 1,980,527 | Hewton | Nov. 13, 1934 |
| 2,354,606 | Oertel | July 25, 1944 |
| 2,460,658 | Roehri | Feb. 1, 1949 |
| 2,481,270 | Wennerbo | Sept. 6, 1949 |